US011616399B2

(12) United States Patent
Kanakasabai et al.

(10) Patent No.: US 11,616,399 B2
(45) Date of Patent: Mar. 28, 2023

(54) WIRELESS CHARGING DEVICE, A RECEIVER DEVICE, AND A METHOD OF OPERATING THE SAME

(71) Applicant: General Electric Company, Schenectady, NY (US)

(72) Inventors: Viswanathan Kanakasabai, Bangalore (IN); Suma Memana Narayana Bhat, Bangalore (IN); Arun Kumar Raghunathan, Bangalore (IN); Rahul Bhujade, Bangalore (IN); Satishbabu Bhogineni, Chennai (IN); Somakumar Ramachandrapanicker, Bangalore (IN)

(73) Assignee: General Electric Company, Schenectady, NY (US)

( * ) Notice: Subject to any disclaimer, the term of this patent is extended or adjusted under 35 U.S.C. 154(b) by 52 days.

(21) Appl. No.: 16/616,914

(22) PCT Filed: Apr. 19, 2018

(86) PCT No.: PCT/US2018/028232
§ 371 (c)(1),
(2) Date: Nov. 25, 2019

(87) PCT Pub. No.: WO2018/222287
PCT Pub. Date: Dec. 6, 2016

(65) Prior Publication Data
US 2020/0153283 A1 May 14, 2020

(30) Foreign Application Priority Data
May 30, 2017 (IN) .............................. 201741019041

(51) Int. Cl.
*H02J 3/02* (2006.01)
*H02J 50/12* (2016.01)
(Continued)

(52) U.S. Cl.
CPC ................ *H02J 50/12* (2016.02); *H02J 3/02* (2013.01); *H02J 7/02* (2013.01); *H02J 50/10* (2016.02);
(Continued)

(58) Field of Classification Search
CPC ...................................................... H02J 50/12
(Continued)

(56) References Cited

U.S. PATENT DOCUMENTS 9,716,400 B2   7/2017   Huang et al.
10,666,082 B2   5/2020   Park et al.
(Continued)

FOREIGN PATENT DOCUMENTS

CN      102480147       5/2012
KR   1020120015921 A    2/2012
(Continued)

OTHER PUBLICATIONS

"India Application No. 201741019041 Examination Report", dated Oct. 31, 2019, 6 pages.
(Continued)

*Primary Examiner* — Edward Tso
*Assistant Examiner* — Ahmed H Omar
(74) *Attorney, Agent, or Firm* — DeLizio Law, PLLC (57) ABSTRACT

A wireless charging device includes a driver unit configured to generate one of a first AC voltage signal having a first frequency and a second AC voltage signal having a second frequency. Also, the wireless charging device includes a transmitting unit having a first coil and a first capacitor and configured to transmit the first AC voltage signal. Further, the transmitting unit includes a second coil and a second capacitor and configured to transmit the second AC voltage signal. Additionally, the wireless charging device includes a control unit configured to detect a first receiver device (Continued)

operating at the first frequency based on a change in a first voltage in the transmitting unit, and detect a second receiver device operating at the second frequency based on a change in a second voltage in the transmitting unit.

21 Claims, 4 Drawing Sheets

(51) Int. Cl.
| | | |
|---|---|---|
| | *H02J 50/90* | (2016.01) |
| | *H02J 50/60* | (2016.01) |
| | *H02J 50/40* | (2016.01) |
| | *H02J 7/02* | (2016.01) |
| | *H02J 50/10* | (2016.01) |

(52) U.S. Cl.
CPC ............ *H02J 50/40* (2016.02); *H02J 50/402* (2020.01); *H02J 50/60* (2016.02); *H02J 50/90* (2016.02)

(58) Field of Classification Search
USPC ........................................................ 320/108
See application file for complete search history.

(56) References Cited

U.S. PATENT DOCUMENTS

| | | | |
|---|---|---|---|
| 2011/0053500 A1 | 3/2011 | Menegoli et al. | |
| 2014/0184150 A1 | 7/2014 | Walley | |
| 2018/0294681 A1* | 10/2018 | Bae | .......................... H02J 50/90 |
| 2018/0301933 A1* | 10/2018 | Lee | .......................... H02J 50/10 |

FOREIGN PATENT DOCUMENTS

| | | |
|---|---|---|
| KR | 1020170002903 A | 1/2017 |
| KR | 1020170054708 A | 5/2017 |

OTHER PUBLICATIONS

International Search Report issued in connection with PCT/US2018/028232 dated Jul. 24, 2018.

"China patent application No. 201880035715.7 Office Action", dated Feb. 11, 2023, 12 pages.

* cited by examiner

WIRELESS CHARGING DEVICE, A RECEIVER DEVICE, AND A METHOD OF OPERATING THE SAME

BACKGROUND

Embodiments of the present specification relate generally to wireless power transfer systems, and more particularly to a wireless charging device, and a receiver device in wireless power transfer systems.

In general, power transfer system includes a charging devices widely used to transfer power from a power source to one or more receiver devices, such as mobile devices, biomedical devices, and portable consumer devices. Typically, the power transfer systems are contact based power transfer systems or wireless power transfer systems. In certain applications, where instantaneous or continuous power transfer is required but interconnecting wires are inconvenient, the wireless power transfer systems are desirable.

In wireless power transfer systems, a charging device is used to convert an input power to a transferrable power which is then wirelessly transmitted to charge one or more batteries in the receiver devices. Each receiver device is compatible with one wireless frequency standard. Currently available frequency standards include a Wireless Power Consortium (WPC) with Qi standard and an Air fuel Alliance (AFA) standard. The Qi standard is defined in a frequency range from 100 kHz to 400 kHz, while the AFA standard is defined in a frequency range from 6 MHz to 8 MHz, for example. Further, design of any new wireless receiver devices will entail use of one of these two frequency standards.

A conventional charging device transmits the input power at only one frequency standard. Hence, for each frequency standard, separate charging devices are employed to transmit electric power to the corresponding receiver device. However, using separate charging devices for each frequency standard substantially increases set-up costs and maintenance costs of the wireless power transfer systems. Moreover, the conventional charging device may continuously transmit the power even if the receiver device is not present. Such transmission of power results in power loss and affects efficiency of the charging device.

BRIEF DESCRIPTION

Briefly in accordance with one aspect of the present specification, a wireless charging device is presented. The wireless charging device includes a driver unit configured to generate one of a first alternating current (AC) voltage signal having a first frequency and a second alternating current (AC) voltage signal having a second frequency. Also, the wireless charging device includes a transmitting unit coupled to the driver unit, wherein the transmitting unit includes a first coil and a first capacitor coupled to each other and configured to transmit the first AC voltage signal having the first frequency. Further, the transmitting unit includes a second coil and a second capacitor coupled to each other and configured to transmit the second AC voltage signal having the second frequency. In addition, the wireless charging device includes a control unit coupled to the transmitting unit and the driver unit, wherein the control unit is configured to detect a first receiver device operating at the first frequency based on a change in a first voltage with reference to a first threshold value, at a first junction between the first coil and the first capacitor, and detect a second receiver device operating at the second frequency based on a change in a second voltage with reference to a second threshold value, at a second junction between the second coil and the second capacitor.

In accordance with another embodiment of the present specification, a receiver device is presented. The receiver device includes a receiving unit comprising a receiver coil and a receiver capacitor coupled to each other and configured to receive one of a first alternating current (AC) voltage signal having a first frequency and a second alternating current (AC) voltage signal having a second frequency from a wireless charging device. Also, the receiver device includes a rectifier unit coupled to the receiving unit and configured to convert one of the first alternating current (AC) voltage signal having the first frequency and the second alternating current (AC) voltage signal having the second frequency to a DC load signal. Further, the receiver device includes a receiver confirmation unit coupled to the rectifier unit and configured to receive the DC load signal and in response change an impedance across the receiving unit for a predefined time period to confirm a presence of the receiver device to the wireless charging device.

In accordance with another embodiment of the present specification, a method for detecting a receiver device is presented. The method includes generating, by a driver unit, one of a first alternating current (AC) voltage signal having a first frequency and a second alternating current (AC) voltage signal having a second frequency. Also, the method includes transmitting, by a first coil and a first capacitor in a transmitting unit, the first AC voltage signal having the first frequency, if the first AC voltage signal is generated. Further, the method includes transmitting, by a second coil and a second capacitor in the transmitting unit, the second AC voltage signal having the second frequency, if the second AC voltage signal is generated. In addition, the method includes detecting, by a control unit, the first receiver device based on a change in a first voltage at a first junction between the first coil and the first capacitor. Furthermore, the method includes detecting, by the control unit, the second receiver device based on a change in a second voltage at a second junction between the second coil and the second capacitor.

In accordance with another embodiment of the present specification, a wireless power transfer system is presented. The wireless power transfer system includes a wireless charging device including a driver unit configured to generate one of a first alternating current (AC) voltage signal having a first frequency and a second alternating current (AC) voltage signal having a second frequency. Also, the wireless charging device includes a transmitting unit coupled to the driver unit and configured to transmit the first AC voltage signal having the first frequency and the second AC voltage signal having the second frequency. Furthermore, the wireless charging device includes a control unit coupled to the transmitting unit and the driver unit, wherein the control unit is configured to detect a first receiver device operating at the first frequency based on a change in a first voltage with reference to a first threshold value, at a first junction in the transmitting unit and a second receiver device operating at the second frequency based on a change in a second voltage with reference to a second threshold value, at a second junction in the transmitting unit. In addition, the wireless power transfer system includes the receiver device configured to be coupled to the wireless charging device, wherein the receiver device includes a receiving unit configured to receive one of the first AC voltage signal having the first frequency and the second AC voltage signal having the second frequency from the wireless charging device. Also, the receiver device includes a rectifier unit coupled to the receiving unit and configured to convert one of the first AC voltage signal having the first frequency and the second AC voltage signal having the second frequency to a DC load signal. Further, the receiver device includes a receiver confirmation unit coupled to the rectifier unit and configured to receive the DC load signal and in response change an impedance across the receiving unit for a predefined time period to confirm a presence of the receiver device to the wireless charging device.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As will be described in detail hereinafter, various embodiments of a system and method for charging one or more wireless receiver devices are disclosed. In particular, embodiments of the system and the method disclosed herein disclose detecting the receiver device prior to continuously transmitting electric power to the receiver device. Further, the embodiments of the system and the method disclosed herein disclose confirming a presence of the receiver device at regular intervals while transmitting the electric power to the receiver device.

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. The use of terms "including," "comprising" or "having" and variations thereof herein are meant to encompass the items listed thereafter and equivalents thereof as well as additional items. The terms "connected" and "coupled" are not restricted to physical or mechanical connections or couplings and can include electrical connections or couplings, whether direct or indirect. Furthermore, terms "circuit" and "circuitry" and "control unit" may include either a single component or a plurality of components, which are either active and/or passive and are connected or otherwise coupled together to provide the described function. In addition, the term operationally coupled as used herein includes wired coupling, wireless coupling, electrical coupling, magnetic coupling, radio communication, software based communication, or combinations thereof.

Figure 1:
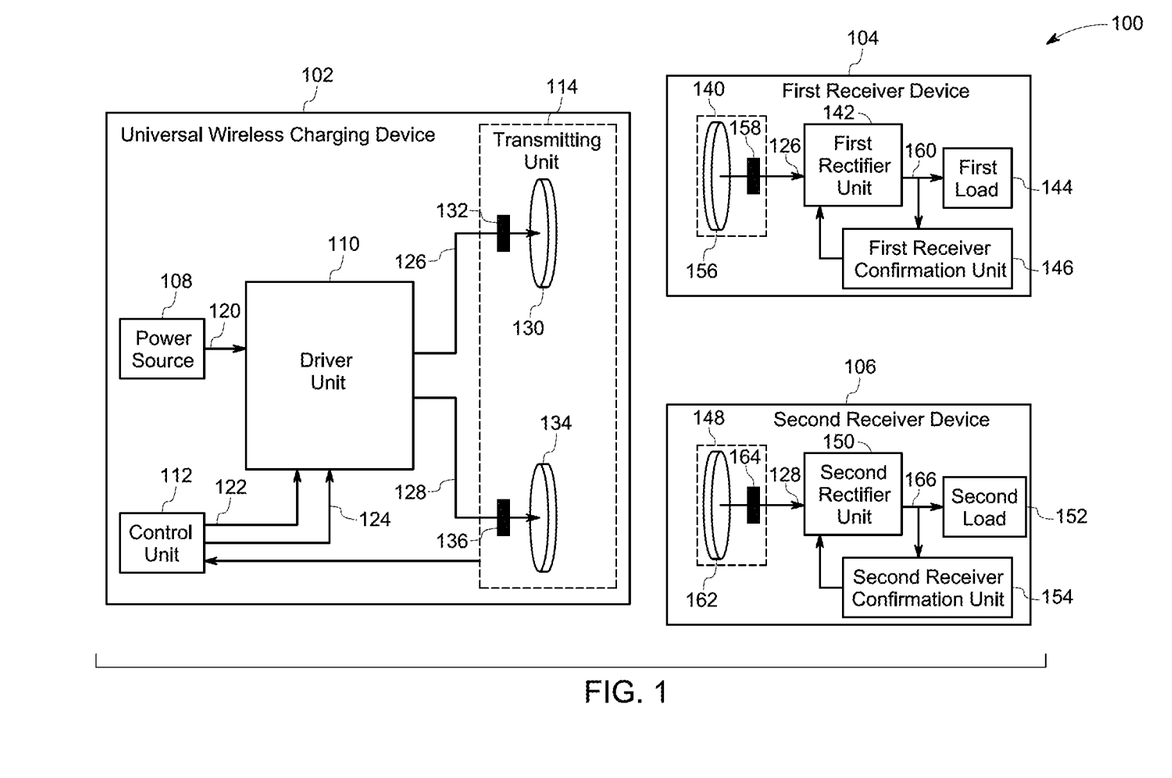
FIG. 1 is a block diagram of a wireless power transfer system in accordance with certain embodiments of the present invention.

FIG. 1 is a block diagram of a wireless power transfer system 100 in accordance with embodiments of the present invention. The wireless power transfer system 100 is used to transmit electric power.

In the illustrated embodiment, the wireless power transfer system 100 includes a universal wireless charging device 102 that is wirelessly coupled to a first receiver device 104 and a second receiver device 106. It may be noted that the terms "universal wireless charging device," "wireless charging device," and "charging pad" may be used interchangeably in the following description and may be denoted by same reference numeral.

Further, the first and second receiver devices 104, 106 may be compatible with one of the wireless frequency standards. For example, one of the first and second receiver devices 104, 106 may be compatible with an Air Fuel Alliance (AFA) standard that is defined in a frequency range from 6 MHz to 8 MHz. Similarly, another of the first and second receiver devices may be compatible with the Wireless Power Consortium (WPC) with Qi standard that is defined in a frequency range from 100 kHz to 400 kHz. For ease of explanation, the first receiver device 104 is considered to be compatible with a first frequency standard, such as the AFA standard. Similarly, the second receiver device 106 is considered to be compatible with a second frequency standard, such as the Qi standard. Although the first and second receiver devices 104, 106 are described as adhering to one of the two currently available frequency standards, it may be noted that the receiver devices 104, 106 may adhere to other frequency standards and are not limited to the frequency standards mentioned herein. Although the wireless power transfer system 100 is depicted as including two receiver devices 104, 106, use of any number of receiver devices that are compatible with one or more frequency standards is envisioned.

The first and second receiver devices 104, 106 may be mobile devices, biomedical devices, portable consumer devices, and the like. The mobile devices may be cell phones, laptops, and the like.

As previously noted, in conventional power transfer systems, a charging device is operated at only one frequency standard to transmit electric power to receiver devices. Hence, a separate charging device having a separate converter and a separate coil for each frequency standard are employed to transmit electric power to the corresponding receiver device. Use of separate charging devices for each frequency standard substantially increases costs associated with the set-up and maintenance of the conventional power transfer systems. Also, use of separate charging devices to charge the receiver devices having different frequency standards is inconvenient for a user. Moreover, the charging device may continuously generate electromagnetic field to transmit electric power even if the receiver device is not present, resulting in power loss and reduction in overall efficiency.

The wireless charging device 102 is configured to charge the first and second receiver devices 104, 106 only if the receiver devices 104, 106 are present at a proximate location. Further, the wireless charging device 102 is configured to charge both the first and second receiver devices 104, 106 having different frequency standards, thereby obviating the need for separate charging devices for charging receiver devices that adhere to different frequency standards. In particular, the wireless charging device 102 includes a control unit 112 configured to detect the first and second receiver devices 104, 106.

In addition to the control unit 112, the wireless charging device 102 includes a power source 108, a driver unit 110, and a transmitting unit 114. The driver unit 110 is coupled to the power source 108, the control unit 112, and the transmitting unit 114. The power source 108 is used to supply input power having a DC voltage 120 to the driver unit 110. In one embodiment, the input power may be in a range from about 1 Watt to about 200 Watts. In one embodiment, the power source 108 may be a part of the wireless charging device 102. In another embodiment, the power source 108 may be positioned external to the wireless charging device 102. It may be noted that the input power having the DC voltage 120 may also be alternatively referred to as a "DC voltage signal" in the following description.

The control unit 112 is configured to generate a first control signal 122 and a second control signal 124. In particular, prior to detecting the first and second receiver devices 104, 106, the control unit 112 is configured to repeatedly and alternately generate the first control signal 122 and the second control signal 124. In one embodiment, the first control signal 122 is generated for a first time period and the second control signal 124 is generated for a second time period after a predetermined time interval from the first time period. In one example, the first and second time periods are in a range from about 5 milliseconds to about 100 milliseconds. The predetermined time interval is in a range from about 5 milliseconds to about 500 milliseconds. It may be noted that the first and second control signals 122, 124 may be generated in any desired pattern, and is not limited to the pattern of "repeatedly and alternately" generating the first and second control signals 122, 124 as mentioned above. Further, if the first receiver device 104 is detected, the control unit 112 continuously generates the first control signal 122 until the presence of the first receiver device 104 is detected. Similarly, if the second receiver device 106 is detected, the control unit 112 continuously generates the second control signal 124 until the presence of the second receiver device 106 is detected.

If both the first and second receiver devices 104, 106 are detected, the control unit 112 alternately and repeatedly communicates the first control signal 122 and the second control signal 124 to transmit electric power to both the first and second receiver devices 104, 106. It may be noted that the first and second control signals 122, 124 may be communicated in any desired pattern, and is not limited to the pattern of "repeatedly and alternately" communicating the first and second control signals 122, 124 as mentioned above. For ease of understanding of the specification, the embodiment of detecting one of the first and second receiver devices 104, 106 and communicating the first control signal 122 or the second control signal 124 is discussed in the following description.

Further, the driver unit 110 is configured to receive the DC voltage signal 120 from the power source 108. Additionally, the driver unit 110 is configured to receive the first control signal 122 or the second control signal 124 from the control unit 112. The driver unit 110 is configured to transform the DC voltage signal 120 based on the first control signal 122 or the second control signal 124 received from the control unit 112. By way of example, if the first control signal 122 is received from the control unit 112, the driver unit 110 is configured to convert the DC voltage signal 120 to a first AC voltage signal 126 having a first frequency. It may be noted that the first frequency may be one of the frequencies corresponding to a frequency band associated with the first frequency standard. In one embodiment, the first frequency may be about 6.8 MHz. In a similar manner, if the second control signal 124 is received from the control unit 112, the driver unit 110 is configured to convert the DC voltage signal 120 to a second AC voltage signal 128 having a second frequency. It may be noted that the second frequency may be one of the frequencies corresponding to a frequency band associated with the second frequency standard. In one embodiment, the second frequency may be about 200 kHz. Furthermore, in one embodiment, magnitudes of the first and second AC voltage signals 126, 128 may be in a range from about 5 Volts to about 50 Volts. It may be noted that the first AC voltage signal 126 may be referred as a "high frequency signal" and the second AC voltage signal 128 may be referred as a "low frequency signal." Further, the driver unit 110 is configured to transmit the first AC voltage signal 126 or the second AC voltage signal 128 to the transmitting unit 114.

The transmitting unit 114 is configured to wirelessly transmit the first AC voltage signal 126 or the second AC voltage signal 128 to the first and second receiver devices 104, 106. It may be noted that the electric power for charging the first and second receiver devices 104, 106, is transmitted in the form of the first AC voltage signal 126 or the second AC voltage signal 128 to the first and second receiver devices 104, 106. As depicted in FIG. 1, the transmitting unit 114 includes a first coil 130, a first capacitor 132, a second coil 134, and a second capacitor 136 that are coupled to the driver unit 110. It may be noted that in other embodiments, the transmitting unit 114 may include a plurality of first coils 130 and a plurality of second coils 1348. Further, the first coil 130 and the first capacitor 132 are tuned to the first frequency or proximate to the first frequency to transmit the first AC voltage signal 126 having the first frequency. In a similar manner, the second coil 134 and the second capacitor 136 are tuned to the second frequency or proximate to the second frequency to transmit the second AC voltage signal 128 having the second frequency.

The first receiver device 104 includes a first receiving unit 140, a first rectifier unit 142, a first load 144, and a first receiver confirmation unit 146. Similarly, the second receiver device 106 includes a second receiving unit 148, a second rectifier unit 150, a second load 152, and a second receiver confirmation unit 154. Also, as previously noted, the first and second receiver devices 104, 106 are configured to receive electric power in the form of the first AC voltage signal 126 or the second AC voltage signal 128 to charge the first load 144 or the second load 152. The first and second loads 144 or 152 may be batteries. Alternatively, the first and second loads 144, 152 may be passive loads like resistive loads or other kinds of active loads.

Further, the first receiving unit 140 includes a first receiver coil 156 and a first receiver capacitor 158 that are tuned to the first frequency to receive the first AC voltage signal 126 having the first frequency from the wireless charging device 102. In particular, the first receiver coil 156 is wirelessly coupled to the first coil 130 in the wireless charging device 102. If the driver unit 110 generates the first AC voltage signal 126 having the first frequency, the first coil 130 is excited to transmit the first AC voltage signal 126 having the first frequency to the first receiver coil 156 in the first receiver device 104. In one embodiment, the first coil 130 generates a magnetic field that is corresponding to the first AC voltage signal 126. Further, the generated magnetic field is received by the first receiver coil 156 in the first receiver device 104 in the form of the first AC voltage signal 126. The first rectifier unit 142 in the first receiver device 104 is configured to receive the first AC voltage signal 126 from the first receiver coil 156 and convert the first AC voltage signal 126 to a first DC load signal 160. The first DC load signal 160 is used to charge the first load 144, such as a battery in the first receiver device 104.

In one exemplary embodiment, the first receiver confirmation unit 146 is configured to change an impedance across the first receiving unit 140 at regular time intervals to confirm a presence of the first receiver device 104 to the wireless charging device 102. More specifically, the first receiver confirmation unit 146 receives the first DC load signal 160 from the first rectifier unit 142. In one embodiment, the first DC load signal 160 is used to activate or switch ON the first receiver confirmation unit 146. In response to receiving the first DC load signal 160, the first receiver confirmation unit 146 changes the impedance across the first receiving unit 140. The change in impedance may cause a first voltage at the first coil 130 to change accordingly. The first voltage may be referred to as a magnitude or a peak voltage of the first AC voltage signal 126 at the first coil 130. Further, the control unit 112 monitors the change in the first voltage and detects the first receiver device 104, if a change in the first voltage at the first coil 130 is greater than a first threshold value. Upon detecting the first receiver device 104, the control unit 112 continuously generates the first control signal 122 to drive the driver unit 110 to continuously transmit electric power in the form of the first AC voltage signal 126 to the first receiver device 104. Further, the driver unit 110 transmits the first AC voltage signal 126 until the presence of the first receiver device 104 is detected. The aspect of detecting the first receiver device 104 and transmitting the electric power to the first receiver device 104 is described in greater detail with reference to FIG. 2.

In a similar manner, the second receiving unit 148 includes a second receiver coil 162 and a second receiver capacitor 164 that are tuned to the second frequency to receive the second AC voltage signal 128 having the second frequency from the wireless charging device 102. In particular, the second receiver coil 162 is wirelessly coupled to the second coil 134 in the wireless charging device 102. If the driver unit 110 generates the second AC voltage signal 128 having the second frequency, the second coil 134 is excited to transmit the second AC voltage signal 128 having the second frequency to the second receiver coil 162 in the second receiver device 106. In one embodiment, the second coil 134 generates a magnetic field that is corresponding to the second AC voltage signal 128. Further, the generated magnetic field is received by the second receiver coil 162 in the second receiver device 106 in the form of the second AC voltage signal 128. The second rectifier unit 150 in the second receiver device 106 is configured to receive the second AC voltage signal 128 from the second receiver coil 162 and convert the second AC voltage signal 128 to a second DC load signal 166. The second DC load signal 166 is used to charge the second load 152, such as a battery in the second receiver device 106.

In one exemplary embodiment, the second receiver confirmation unit 154 is configured to change an impedance across the second receiving unit 148 at regular time intervals to confirm a presence of the second receiver device 106 to the wireless charging device 102. More specifically, the second receiver confirmation unit 154 receives the second DC load signal 166 from the second rectifier unit 150. In one embodiment, the second DC load signal 166 is used to activate or switch ON the second receiver confirmation unit 154. In response to receiving the second DC load signal 166, the second receiver confirmation unit 154 changes the impedance across the second receiving unit 148. The change in the impedance causes a second voltage at the second coil 134 to change accordingly. The second voltage may be to referred as a magnitude or a peak voltage of the second AC voltage signal 128 at the second coil 134. Further, the control unit 112 monitors the change in the second voltage and detects the second receiver device 106, if the change in the second voltage at the second coil 134 is greater than a second threshold value. Upon detecting the second receiver device 106, the control unit 112 continuously generates the second control signal 124 to drive the driver unit 110 to continuously transmit electric power in the form of the second AC voltage signal 128 to the second receiver device 106. Further, the driver unit 110 transmits the second AC voltage signal 128 until the presence of the second receiver device 106 is detected. The aspect of confirming the presence of the second receiver device 106 and transmitting the electric power to the second receiver device 106 is described in greater detail with reference to FIG. 2.

In accordance with the exemplary embodiment, the wireless power transfer system 100 allows transmission of the electric power continuously to the first and second receiver devices 104, 106 only after detecting the presence of the first and second receiver devices 104, 106. As a result, power loss in the wireless power transfer system 100 is reduced and efficiency of the wireless charging device 102 is enhanced. Further, the exemplary wireless charging device 102 allows wireless transmission/transfer of electric power to the first and second receiver devices 104, 106 that are compatible with one or more frequency standards. Accordingly, use of a single wireless charging device enables charging of a plurality of receiver devices that conform to different frequency standards, thereby obviating the need of a plurality of charging devices.

Figure 2:
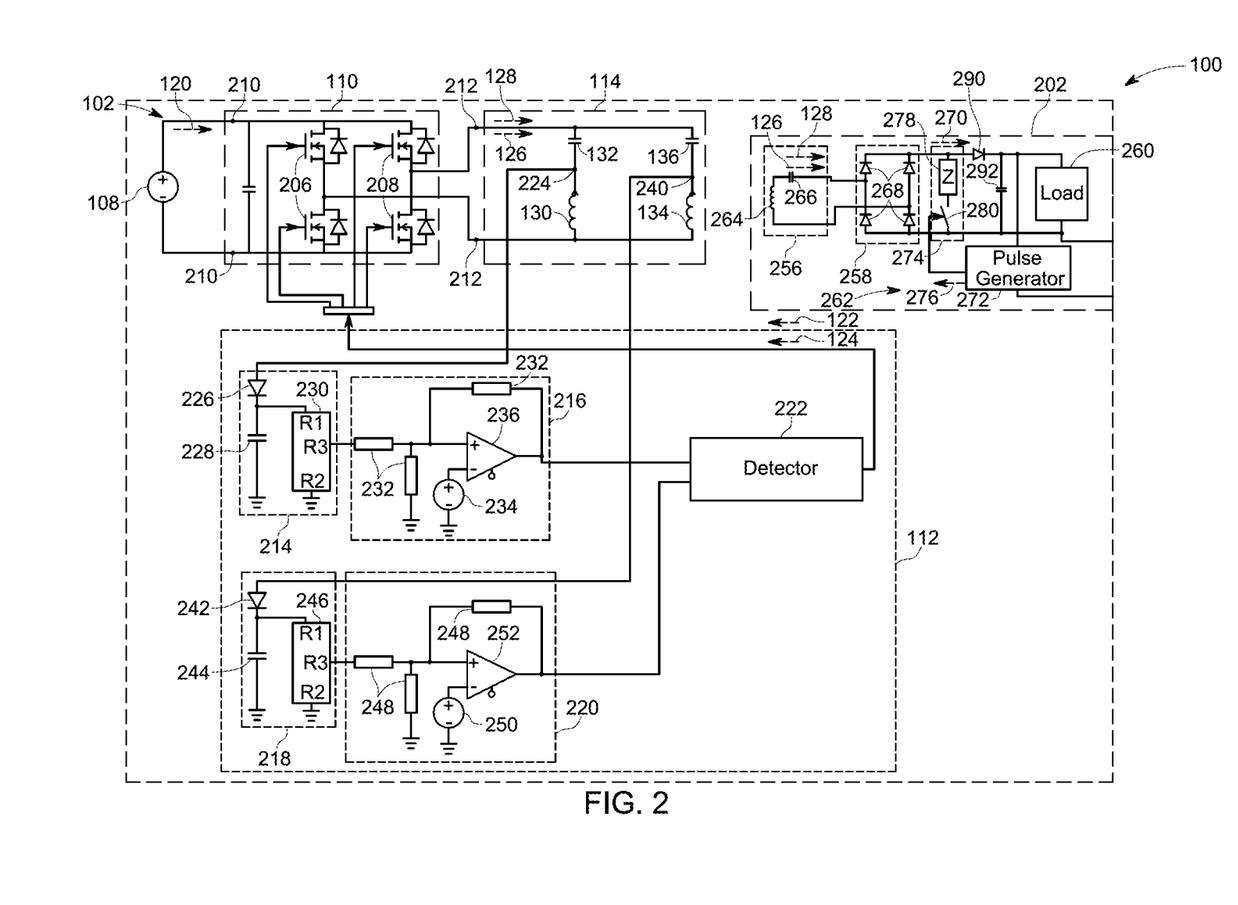
FIG. 2 is a diagrammatical representation of a wireless power transfer system in accordance with certain embodiments of the present invention.

Referring to FIG. 2, a schematic representation of the wireless power transfer system 100 in accordance with certain embodiments of the present invention is depicted. The wireless power transfer system 100 includes the wireless charging device 102 that is capable of magnetically coupling to a receiver device 202 for performing wireless power transmission to the receiver device 202. The receiver device 202 may be similar to the first receiver device 104 or the second receiver device 106 shown in the embodiment of FIG. 1.

As discussed earlier, the wireless charging device 102 includes the power source 108, the driver unit 110, the transmitting unit 114, and the control unit 112. The driver unit 110 includes a first leg of switches 206 and a second leg of switches 208 that form a bridge circuit between first terminals 210 and second terminals 212 of the driver unit 110. The first leg of switches 206 and the second leg of switches 208 are activated or deactivated based on the first and second control signals 122, 124 received from the control unit 112 to generate the first AC voltage signal 126 or the second AC voltage signal 128.

The transmitting unit 114 includes the first coil 130 and the first capacitor 132 that are coupled in series to each other and electrically coupled to the second terminals 212 of the driver unit 110. In addition, the transmitting unit 114 includes the second coil 134 and the second capacitor 136 that are coupled in series to each other and electrically coupled to the second terminals 212 of the driver unit 110.

The control unit 112 includes a first peak detecting unit 214, a first comparator 216, a second peak detecting unit 218, a second comparator 220, and a detector 222. The first peak detecting unit 214 is electrically coupled to a first junction 224 between the first coil 130 and the first capacitor 132 in the transmitting unit 114. The first peak detecting unit 214 includes a diode 226, a capacitor 228, and a resistor network 230, configured to measure the first voltage at the first junction 224 in the transmitting unit 114. Further, the first comparator 216 is electrically coupled to the first peak detecting unit 214 and configured to receive the measured first voltage from the first peak detecting unit 214. The first comparator 216 includes resistors 232, a reference voltage source 234, and an opamp-comparator unit 236, configured to determine whether a change in the first voltage at the first junction 224 is greater than a first threshold value. In one embodiment, a voltage of the reference voltage source 234 may be set to the first threshold value. Further, the opamp-comparator unit 236 is configured to compare the first voltage received from the first peak detecting unit 214 with the first threshold value of the reference voltage source 234 to determine whether the change in the first voltage is greater than the first threshold value.

In a similar manner, the second peak detecting unit 218 is electrically coupled to a second junction 240 between the second coil 134 and the second capacitor 136. The second peak detecting unit 218 includes a diode 242, a capacitor 244, and a resistor network 246, configured to measure a second voltage at the second junction 240 in the transmitting unit 114. Further, the second comparator 220 is electrically coupled to the second peak detecting unit 218 and configured to receive the measured second voltage from the second peak detecting unit 218. The second comparator 220 includes resistors 248, a reference voltage source 250, and an opamp-comparator unit 252, configured to determine whether the change in the second voltage at the second junction 240 is greater than a second threshold value. In one embodiment, a voltage of the reference voltage source may be set to the second threshold value. Further, the opamp-comparator unit 252 is configured to compare the second voltage received from the second peak detecting unit 218 with the second threshold value of the reference voltage source 250 to determine whether the change in the second voltage is greater than the second threshold value.

Further, the detector 222 is electrically coupled to the first comparator 216 and the second comparator 220 and configured to generate the first control signal 122 or the second control signal 124. More specifically, if the change in the first voltage is greater than the first threshold value, the first comparator 216 sends a signal to the detector 222 to generate the first control signal 122. Similarly, if the change in the second voltage is greater than the second threshold value, the second comparator 220 sends a signal to the detector 222 to generate the second control signal 124. The detector 222 communicates the first control signal 122 or the second control signal 124 to the driver unit 110 to convert the DC voltage signal 120 to the first AC voltage signal 126 or the second AC voltage signal 128.

As depicted in FIG. 2, the receiver device 202 includes a receiving unit 256, a rectifier unit 258, a load 260, and a receiver confirmation unit 262. The receiving unit 256 includes a receiver coil 264 and a receiver capacitor 266 that are coupled to each other and configured to receive the first AC voltage signal 126 or the second AC voltage signal 128 from the wireless charging device 102. More specifically, if the receiver coil 264 and the receiver capacitor 266 are tuned to the first frequency, the receiving unit 256 receives the first AC voltage signal 126 having the first frequency from the first coil 130 in the wireless charging device 102. Similarly, if the receiver coil 264 and the receiver capacitor 266 are tuned to the second frequency, the receiving unit 256 receives the second AC voltage signal 128 having the second frequency from the second coil 134 in the wireless charging device 102. Moreover, if the receiver coil 264 and the receiver capacitor 266 are tuned to one frequency i.e., the first frequency, the receiver coil 264, and the receiver capacitor 266 generates a high impedance to the AC voltage signal having other frequency i.e., the second frequency. As a result, flow of current at the other frequency i.e., the second frequency, is restricted in the receiver device 202.

Further, the rectifier unit 258 is electrically coupled to the receiving unit 256 and configured to receive the first AC voltage signal 126 or the second AC voltage signal 128 from the receiving unit 256. The rectifier unit 258 includes diodes 268 configured to convert the first AC voltage signal 126 or the second AC voltage signal 128 to the DC load signal 270. Further, the DC load signal 270 is transmitted to the load 260, such as a battery in the receiver device 202.

In the exemplary embodiment, the receiver confirmation unit 262 includes a pulse generator 272 and a switching sub-unit 274 that are electrically coupled to each other. The pulse generator 272 is coupled to the rectifier unit 258 via a diode 290 and a capacitor 292 and is configured to receive the DC load signal 270. In response to receiving the DC load signal 270, the pulse generator 272 generates one or more signal pulses 276. In one example, the pulse generator 272 may be a timer that is configured to transmit signal pulses 276 at regular intervals when activated or switched ON. The DC load signal 270 is used to activate or switch ON the pulse generator 272.

Further, the switching sub-unit 274 is coupled in parallel to the rectifier unit 258 and configured to receive the signal pulses 276 from the pulse generator 272. The switching sub-unit 274 includes an impedance element (Z) 278 and a switch 280 that are coupled in series to each other. In one embodiment, the impedance element (Z) 278 may include a resistor, a capacitor, or a combination thereof. In one embodiment, the switch 280 may be an electronic switch, such as a metal-oxide-semiconductor field-effect transistor (MOSFET). The switch 280 is closed when the signal pulses 276 are received from the pulse generator 272. Further, when the switch 280 is closed, the impedance element (Z) 278 is coupled across the rectifier unit 258 to change the impedance across the receiving unit 256. Further, the switch 280 is opened when the signal pulses 276 are not received from the pulse generator 272. In one embodiment, the switch 280 is closed for a predefined time period after every selected time period. In one example, the predefined time period is in a range from about 0.1 millisecond to about 20 milliseconds. The selected time period between two consecutive predefined time periods may be in a range from about 0.1 second to about 5 seconds.

During operation, the control unit 112 repeatedly and alternately generates the first control signal 122 and the second control signal 124. In particular, prior to detecting the receiver device 202, the control unit 112 generates the first control signal 122 for a first time period and the second control signal 124 for a second time period. In one embodiment, the first and second time periods are in a range from about 5 milliseconds to about 100 milliseconds. In one embodiment, the second control signal 124 is generated after the predetermined time interval from the first time period. It may be noted that this predetermined time interval is also referred to as a third predetermined time interval in the below description. In one embodiment, the third predetermined time interval is in a range from about 5 milliseconds to about 500 milliseconds. Also, generation of one set of first and second AC voltage signals 126, 128 and another consecutive set of first and second AC voltage signals 126, 128 are separated by a fourth predetermined time interval. In one embodiment, the fourth predetermined time interval is in a range from about 500 milliseconds to about 10 seconds.

The driver unit 110 is configured to receive the DC voltage signal 120 from the power source 108. Additionally, the driver unit 110 is configured to receive the first control signal 122 or the second control signal 124 from the control unit 112. The first control signal 122 is generated for the first time period. Hence, the driver unit 110 converts the DC voltage signal 120 to the first AC voltage signal 126 having the first frequency and transmits the first AC voltage signal 126 for the first time period via the first coil 130 in the transmitting unit 114. If the first receiver 104 is not detected, the second control signal 124 is generated for the second time period. The driver unit 110 converts the DC voltage signal 120 to the second AC voltage signal 128 having the second frequency and transmits the second AC voltage signal 128 for the second time period via the second coil 134 in the transmitting unit 114. Further, the control unit 112 monitors the change in the first voltage at the first junction 224 and the change in the second voltage at the second junction 240 of the transmitting unit 114.

In one embodiment, if the receiver device 202 is compatible with the first frequency standard, the receiver coil 264 in the receiver device 202 receives the first AC voltage signal 126 having the first frequency from the first coil 130 in the wireless charging device 102. Further, the rectifier unit 258 converts the first AC voltage signal 126 to the DC load signal 270 and transmits the DC load signal 270 to the load 260 in the receiver device 202. Also, the rectifier unit 258 transmits the DC load signal 270 to the receiver confirmation unit 262 to activate or switch ON the pulse generator 272 in the receiver confirmation unit 262. Further, the pulse generator 272 transmits one signal pulse 276 to the switching sub-unit 274 to close the switch 280 in the switching sub-unit 274 for a predefined time period. More specifically, the signal pulse 276 is transmitted to the switching sub-unit 274 to communicate to the wireless charging device 102 that the receiver device 202 is present and the receiver device 202 is capable of receiving the first AC voltage signal 126 from the wireless charging device 102. More signal pulses 276 are transmitted to the switch 280 for a predefined time period after every selected time period. In one example, the predefined time period is in a range from about 0.1 milliseconds to about 20 milliseconds. The selected time period between two consecutive predefined time periods may be in a range from about 0.1 seconds to about 5 seconds.

Further, when the switch 280 is closed for the predefined time period, the impedance across the receiver coil 264 is changed to below a predefined value. Consequently, the first voltage at the first junction 224 between the first coil 130 and the first capacitor 132 is increased. More specifically, when the switch 280 is closed for the predefined time period, the change in the first voltage is greater than the first threshold value for the predefined time period.

The control unit 112 monitors the change in the first voltage at the first junction 224. Further, the control unit 112 detects the receiver device 202 if the change in the first voltage at the first junction 224 is greater than the first threshold value. More specifically, the control unit 112 determines that the receiver device 202 is positioned within a predetermined distance from the wireless charging device 102. In one embodiment, the predetermined distance is in a range from about 2 mm to about 10 mm. In some instances, a foreign object may be positioned proximate to the wireless charging device 102. As a result, the change in the first voltage at the first junction 224 may increase to greater than the first threshold value. Such a change in the first voltage to greater than the first threshold value may occur for more than the predefined time period. The control unit 112 verifies a duration of the change in the first voltage at the first junction 224 to distinguish the receiver device 202 from the foreign object. If the change in the first voltage to greater than the first threshold value occurs for only the predefined time period, the control unit 112 confirms that the receiver device 202 is present. Otherwise, the control unit 112 determines that the foreign object is present and stops transmitting the electric power in the form of the first AC voltage signal 126 or the second AC voltage signal 128. In one embodiment, the control unit 112 is configured to control the driver unit 110 to stop transmitting the first AC voltage signal 126 or the second AC voltage signal 128. It may be noted that the foreign object may be any electrically conductive element/component other than the receiver device 202. In one example, the foreign object may include a metal sheet, a coin, or the like.

Upon detecting the receiver device 202, the control unit 112 generates the first control signal 122 continuously so that the driver unit 110 continuously transmits the first AC voltage signal 126 as the electric power to the receiver device 202. At the receiver device 202, the rectifier unit 258 continues to convert the first AC voltage signal 126 to the DC load signal 270 which is further transmitted to the load 260 in the receiver device 202. Further, the rectifier unit 258 continuously transmits the DC load signal 270 to the receiver confirmation unit 262 until the first AC voltage signal 126 is received from the wireless charging device 102. In one embodiment, the rectifier unit 258 continuously transmits the DC load signal 270 to the receiver confirmation unit 262 to communicate the presence of the receiver device 202 to the wireless charging device 102. More specifically, the pulse generator 272 is in active state until the DC load signal 270 is received from the rectifier unit 258. The pulse generator 272 repeatedly transmits the signal pulses 276 to the switch 280 after every selected time period to close the switch 280 for the predefined time period. As a result, the change in the impedance across the receiving unit 256 is less than the predefined value, which in-turn increases the first voltage at the first junction 224 after every selected time period for only the predefined time period.

Further, the control unit 112 continuously monitors the change in the first voltage at the first junction 224 after detecting the receiver device 202. In particular, the control unit 112 monitors the change in the first voltage at the first junction 224 for at least once in a first predetermined time interval from the previous detection or confirmation instance of the receiver device 202. For example, a duration of the first predetermined time interval may be greater than a duration of the selected time period. In one example, the first predetermined time interval is in a range from about 500 milliseconds to about 5000 milliseconds. The control unit 112 confirms the presence of the receiver device 202 until the change in the first voltage is greater than the first threshold value for at least once in the first predetermined interval. Further, the control unit 112 drives the driver unit 110 to continuously transmit the first AC voltage signal 126 to the receiver device 202 until the presence of the receiver device 202 is detected. If the change in the first voltage is not greater than the first threshold value for at least once in the first predetermined interval, the control unit 112 confirms that the receiver device 202 is not and controls the driver unit 110 to stop transmitting the first AC voltage signal 126.

In another embodiment, if the receiver device 202 is compatible with the second frequency standard, the receiver coil 264 in the receiver device 202 receives the second AC voltage signal 128 having the second frequency from the second coil 134 in the wireless charging device 102. Further, the rectifier unit 258 converts the second AC voltage signal 128 to the DC load signal 270. The rectifier unit 258 transmits the DC load signal 270 to the load 260 and the receiver confirmation unit 262 in the receiver device 202.

As discussed above, the receiver confirmation unit 262 changes the impedance across the receiving unit 256 for the predefined time period after every selected time period. The change in the impedance across the receiving unit 256 changes the second voltage at the second junction 240 in the transmitting unit 114. Further, the control unit 112 detects the receiver device 202 if the change in the second voltage at the second junction 240 is greater than the second threshold value for only the predefined time period.

Upon detecting the receiver device 202, the control unit 112 generates the second control signal 124 continuously so that the driver unit 110 continuously transmits the second AC voltage signal 128 to the receiver device 202. At the receiver device 202, the rectifier unit 258 continuously transmits the DC load signal 270 to the receiver confirmation unit 262 until the second AC voltage signal 128 is received from the wireless charging device 102. Further, the pulse generator 272 is in active state until the DC load signal 270 is received from the rectifier unit 258. The pulse generator 272 repeatedly transmits the signal pulses 276 to the switch 280 after every selected time period to close the switch 280 for the predefined time period. As a result, the change in the impedance across the receiving unit 256 is less than the predefined value, which in-turn increases the second voltage at the second junction 240 after every selected time period for only the predefined time period.

Further, the control unit 112 repeatedly monitors the change in the second voltage at the second junction 240 after detecting the receiver device 202. In particular, the control unit 112 monitors the change in the second voltage at the second junction 240 for at least once in a second predetermined time interval from the previous detection or confirmation instance of the receiver device 202. The second predetermined time interval may be in a range from about 500 milliseconds to about 5000 milliseconds. The control unit 112 confirms a presence of the receiver device 202 until the change in the second voltage is greater than the second threshold value for at least once in the second predetermined interval. The control unit 112 drives the driver unit 110 to continuously transmit the second AC voltage signal 128 to the receiver device 202. If the change in the second voltage is not greater than the second threshold value for at least once in the second predetermined interval, the control unit 112 confirms that the receiver device 202 is not present. As a result, the control unit 112 controls the driver unit 110 to stop transmitting the second AC voltage signal 128.

In one embodiment, the control unit 112 is configured to detect misalignment of the receiver device 202 with reference to the wireless charging device 102 based on the first voltage and/or the second voltage in the wireless charging device 102. More specifically, the control unit 112 monitors the change in the first voltage and the second voltage in the transmitting unit 114 of the wireless charging device 102. If the change in the first voltage or the change in the second voltage is less than a predefined misalignment value, the control unit 112 confirms that the receiver device 202 is misaligned with reference to the wireless charging device 102.

Figure 3:
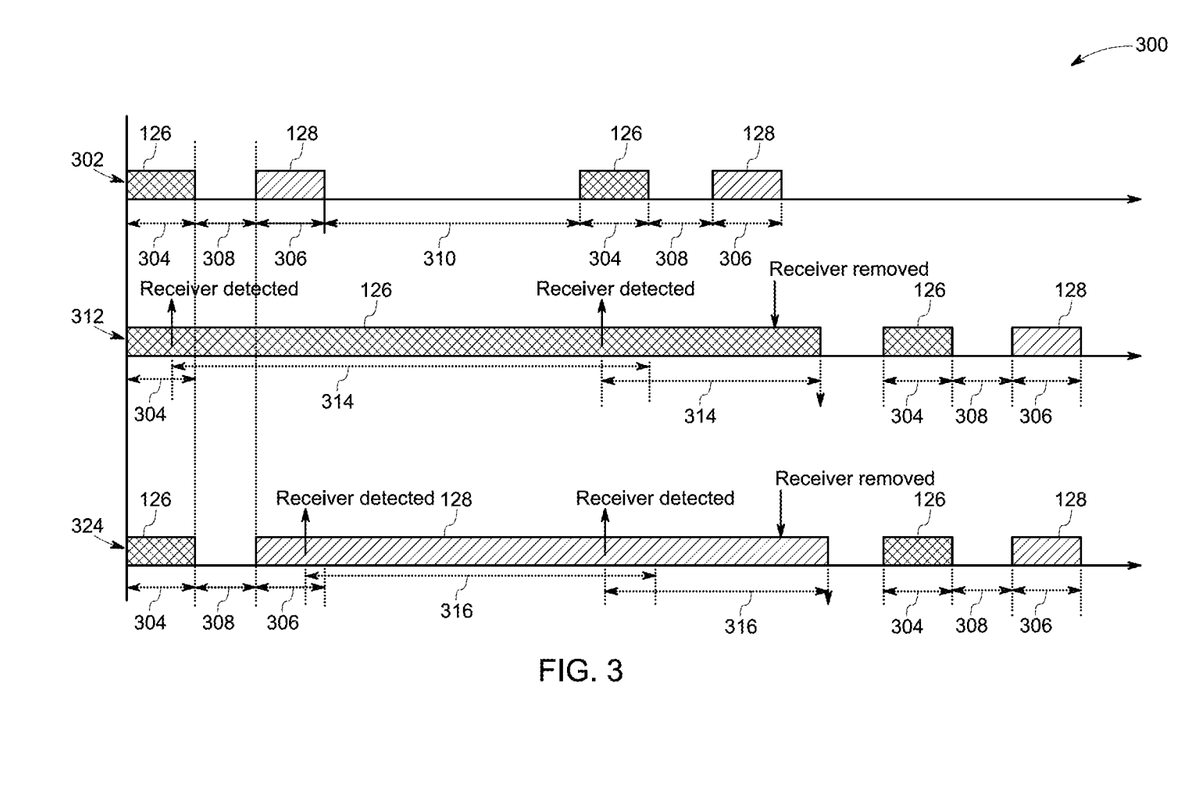
FIG. 3 is a graphical representation of a first AC voltage signal and a second AC voltage signal in accordance with certain embodiments of the present invention.

Referring to FIG. 3, a graphical representation 300 of a first AC voltage signal 126 and a second AC voltage signal 128 in accordance with certain embodiments of the present invention is depicted. Reference numeral 302 represents a scenario of transmitting the first and second AC voltage signals 126, 128 prior to detecting a receiver device. In particular, the first and second AC voltage signals 126, 128 are repeatedly and alternately transmitted from the wireless charging device. The first AC voltage signal 126 is transmitted for a first time period 304 and the second AC voltage signal 128 is transmitted for a second time period 306. The second time period 306 is after a third predetermined time interval 308 from the first time period 304. The reference numeral 310 represents a fourth predetermined time interval between generation of one set of first and second AC voltage signals 126, 128 and another set of first and second AC voltage signals 126, 128.

Further, reference numeral 312 represents a scenario of transmitting the first AC voltage signal 126 after detecting the receiver device that is compatible with the first frequency standard. The first AC voltage signal 126 is continuously transmitted to the receiver device until the presence of the receiver device is detected. More specifically, after transmitting the first AC voltage signal 126 for the first time period 304, the control unit monitors a change in the first voltage at the first junction 224 in the transmitting unit. If the change in the first voltage is greater than the first threshold value, within the first time period 304, the control unit confirms that the receiver device is present. Further, the control unit repeatedly monitors the change in the first voltage at the first junction after detecting the receiver device. Further, the control unit confirms the presence of the receiver device until the change in the first voltage is greater than the first threshold value at least once in a first predetermined interval 314 from the previous confirmation instance of the receiver device 202. If the receiver device is not present, the change in the first voltage is not increased to greater than the first threshold value for more than the first predetermined interval 314 from the previous confirmation of the receiver device. The control unit controls the driver unit to stop continuous transmission of the first AC voltage signal 126.

Further, reference numeral 324 represents a scenario of transmitting the second AC voltage signal 128 after detecting the receiver device that is compatible with the second frequency standard. The second AC voltage signal 128 is continuously transmitted to the receiver device until the presence of the receiver device is detected. More specifically, after transmitting the second AC voltage signal 128 for the second time period 306, the control unit monitors a change in the second voltage at the second junction in the transmitting unit. If the change in the second voltage is greater than the second threshold value, within the second time period 306, the control unit confirms that the receiver device is present. Further, the control unit repeatedly monitors the change in the second voltage at the second junction after detecting the receiver device. Further, the control unit confirms the presence of the receiver device until the change in the second voltage is greater than the second threshold value at least once in a second predetermined interval 316 from the previous detection or confirmation instance of the receiver device. If the receiver device 202 is not present, the change in the second voltage is not increased to greater than the second threshold value for more than the second predetermined interval 316 from the previous confirmation instance of the receiver device. As a result, the control unit controls the driver unit to stop continuous transmission of the second AC voltage signal 128.

Figure 4:
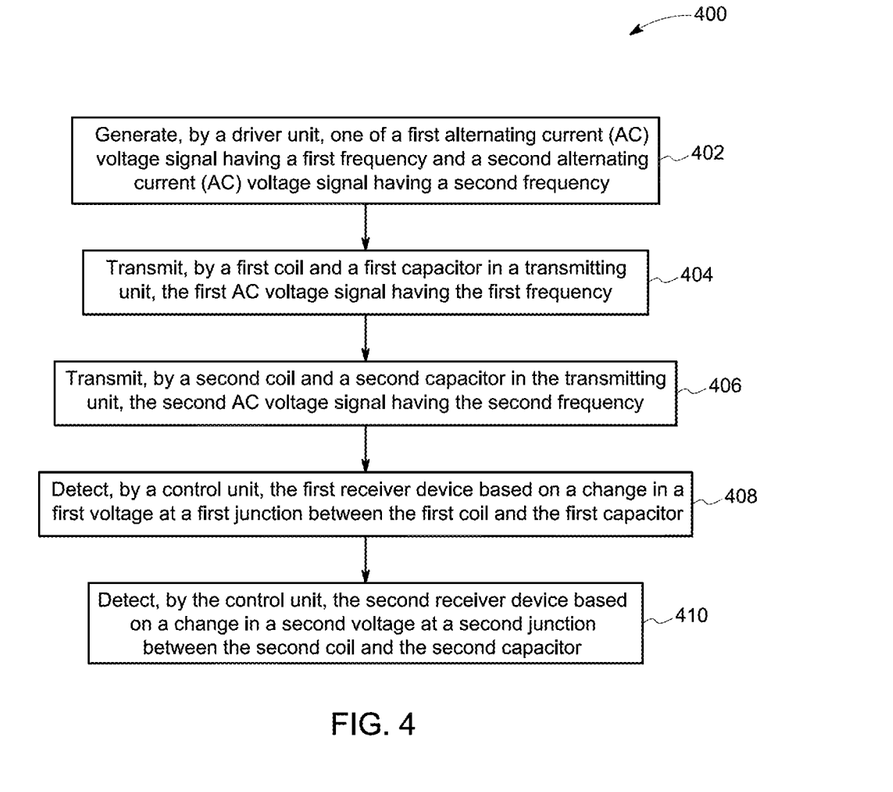
FIG. 4 is a flow chart illustrating a method for detecting a receiver device in accordance with certain embodiments of the present invention.

FIG. 4 is a flow chart illustrating a method 400 for detecting a receiver device in accordance with certain embodiments of the present invention. At step 402, one of a first alternating current (AC) voltage signal having a first frequency and a second alternating current (AC) voltage signal having a second frequency is generated by a driver unit. In particular, if a first control signal is received from the control unit, the driver unit converts a DC voltage signal to the first AC voltage signal having the first frequency. Similarly, if a second control signal is received from the control unit, the driver unit converts the DC voltage signal to the second AC voltage signal having the second frequency.

Subsequently, at step 404, the first AC voltage signal having the first frequency is transmitted by a first coil and a first capacitor in a transmitting unit. More specifically, the first coil and the first capacitor in the transmitting unit are tuned to the first frequency. Further, when the driver unit converts the DC voltage signal to the first AC voltage signal having the first frequency, the first coil is excited to generate a magnetic field that is associated with the first AC voltage signal having the first frequency. The generated magnetic field enables to wirelessly transmit the first AC voltage signal to the receiver device that is compatible with the first frequency standard.

In addition, at step 406, the second AC voltage signal having the second frequency is transmitted by a second coil and a second capacitor in a transmitting unit. More specifically, the second coil and the second capacitor in the transmitting unit are tuned to the second frequency. Further, when the driver unit converts the DC voltage signal to the second AC voltage signal having the second frequency, the second coil is excited to generate a magnetic field that is associated with the second AC voltage signal having the second frequency. The generated magnetic field enables to wirelessly transmit the second AC voltage signal to the receiver device that is compatible with the first frequency standard.

Further, at step 408, the first receiver device is detected by the control unit based on a change in the first voltage at the first junction between the first coil and the first capacitor in the transmitting unit. In particular, when the first receiver device receives the first AC voltage signal, the first receiver confirmation unit in the first receiver device changes the impedance across the first receiving unit. The change in impedance causes a first voltage at the first coil to change accordingly. Further, the control unit monitors the first voltage and detects the first receiver device, if the change in the first voltage at the first coil is greater than a first threshold value. Upon detecting the first receiver device, the control unit continuously generates the first control signal to drive the driver unit to continuously transmit the electric power in the form of the first AC voltage signal to the first receiver device. Further, the driver unit transmits the first AC voltage signal until the presence of the first receiver device is detected.

Further, at step 410, the second receiver device is detected by the control unit based on a change in a second voltage at a second junction between the second coil and the second capacitor in the transmitting unit. In particular, when the second receiver device receives the second AC voltage signal, the second receiver confirmation unit in the second receiver device changes the impedance across the second receiving unit. The change in impedance causes a second voltage at the second coil to change accordingly. Further, the control unit monitors the second voltage and detects the second receiver device, if the change in the second voltage at the second coil is greater than a second threshold value.

Upon detecting the second receiver device, the control unit continuously generates the second control signal to drive the driver unit to continuously transmit the electric power in the form of the second AC voltage signal to the second receiver device. The driver unit transmits the second AC voltage signal until the presence of the second receiver device is detected. It may be noted that the steps 408 and 410 are interchangeable. Also, it may be noted that any instance one of the steps 408, 410 is performed. For example, if the step 408 is performed then the step 410 is not performed.

The various embodiments of the exemplary system and method described hereinabove discloses transmitting voltage signals having different frequencies, thereby enabling charging of wireless receiver devices operating at different frequency standards. In addition, the exemplary system and method described hereinabove discloses transmitting the electric power only if the receiver device is detected. As a result, power loss of the wireless power transfer system is reduced and efficiency is enhanced. Also, by reducing the power loss, efficiency of the wireless charging device may be substantially improved.

While only certain features of the present disclosure have been illustrated and described herein, many modifications and changes will occur to those skilled in the art. It is, therefore, to be understood that the appended claims are intended to cover all such modifications and changes as fall within the true spirit of the present specification.

We claim:

1. A wireless charging device comprising:
   a driver unit configured to generate one of a first alternating current (AC) voltage signal having a first frequency and a second alternating current (AC) voltage signal having a second frequency;
   a transmitting unit coupled to the driver unit, wherein the transmitting unit comprises:
   a first coil and a first capacitor coupled to each other and configured to transmit the first AC voltage signal having the first frequency; and
   a second coil and a second capacitor coupled to each other and configured to transmit the second AC voltage signal having the second frequency; and
   a control unit coupled to the transmitting unit and the driver unit, the control unit configured to:
      detect a first receiver device operating at the first frequency based on a change in a first voltage measured at a first junction between the first coil and the first capacitor, wherein the change in the first voltage is compared with a first threshold value; and
      detect a second receiver device operating at the second frequency based on a change in a second voltage measured at a second junction between the second coil and the second capacitor, wherein the change in the second voltage is compared with a second threshold value.

2. The wireless charging device of claim 1, wherein the control unit is configured to:
   generate a first control signal and transmit the first control signal to the driver unit when the first receiver device is detected; and
   generate a second control signal when the second receiver device is detected and transmit the second control signal to the driver unit.

3. The wireless charging device of claim 2, wherein the driver unit is configured to:
   generate the first AC voltage signal having the first frequency based on the first control signal received from the control unit; and generate the second AC voltage signal having the second frequency based on the second control signal received from the control unit.

4. The wireless charging device of claim 2, wherein the control unit is configured to:
   detect the first receiver device operating at the first frequency if the change in the first voltage at the first junction is greater than the first threshold value; and
   detect the second receiver device operating at the second frequency if the change in the second voltage at the second junction is greater than the second threshold value.

5. The wireless charging device of claim 4, wherein the control unit is configured to:
   monitor the change in the first voltage measured at the first junction after detecting the first receiver device; and
   confirm a presence of the first receiver device until the change in the first voltage is greater than the first threshold value for at least a first predetermined time interval.

6. The wireless charging device of claim 5, wherein the control unit is configured to detect a foreign object if the change in the first voltage is greater than the first threshold value for more than the first predetermined time interval, wherein the control unit is further configured to control the driver unit to stop transmitting the first AC voltage signal if the foreign object is detected.

7. The wireless charging device of claim 5, wherein the driver unit is configured to continuously transmit the first AC voltage signal having the first frequency to the first receiver device until the presence of the first receiver device is confirmed.

8. The wireless charging device of claim 5, wherein the control unit is configured to:
   monitor the change in the second voltage measured at the second junction after detecting the second receiver device; and
   confirm a presence of the second receiver device until the change in the second voltage is greater than the second threshold value for at least a second predetermined time interval.

9. The wireless charging device of claim 8, wherein the control unit is configured to detect a foreign object if the change in the second voltage is greater than the second threshold value for more than the second predetermined time interval, wherein the control unit is further configured to control the driver unit to stop transmitting the second AC voltage signal if the foreign object is detected.

10. The wireless charging device of claim 8, wherein the driver unit is configured to continuously transmit the second AC voltage signal having the second frequency to the second receiver device until the presence of the second receiver device is confirmed.

11. The wireless charging device of claim 8, wherein the driver unit is configured to generate the first AC voltage signal having the first frequency for a first time period for detecting the first receiver device.

12. The wireless charging device of claim 11, wherein the driver unit is configured to generate the second AC voltage signal having the second frequency for a second time period for detecting the second receiver device.

13. The wireless charging device of claim 12, wherein the second time period is after a third predetermined time interval from the first time period.

14. A method comprising:
   generating, by a driver unit, one of a first alternating current (AC) voltage signal having a first frequency and a second alternating current (AC) voltage signal having a second frequency;
   transmitting, by a first coil and a first capacitor in a transmitting unit, the first AC voltage signal having the first frequency, if the first AC voltage signal is generated;
   transmitting, by a second coil and a second capacitor in the transmitting unit, the second AC voltage signal having the second frequency, if the second AC voltage signal is generated;
   detecting, by a control unit, a first receiver device based on a change in a first voltage measured at a first junction between the first coil and the first capacitor; and
   detecting, by the control unit, a second receiver device based on a change in a second voltage measured at a second junction between the second coil and the second capacitor.

15. The method of claim 14, further comprising:
   generating, by the control unit, a first control signal if the first receiver device is detected and transmitting the first control signal to the driver unit;
   generating, by the control unit, a second control signal if the second receiver device is detected and transmitting the second control signal to the driver unit;
   generating, by the driver unit, the first AC voltage signal having the first frequency based on the first control signal received from the control unit; and
   generating, by the driver unit, the second AC voltage signal having the second frequency based on the second control signal received from the control unit.

16. The wireless charging unit of claim 1, wherein the control unit includes:
   a first peak detecting unit coupled with the first junction between the first coil and the first capacitor, the first peak detecting unit configured to measure the change in the first voltage at the first junction;
   a first comparator coupled with first peak detecting unit and configured to compare the change in the first voltage with the first threshold value;
   a second peak detecting unit coupled with the second junction between the second coil and the second capacitor, the second peak detecting unit configured to measure the change in the second voltage at the second junction; and
   a second comparator coupled with second peak detecting unit and configured to compare the change in the second voltage with the second threshold value.

17. The wireless charging unit of claim 16, wherein the control unit includes a detector electrically coupled to the first comparator and the second comparator, wherein the detector is configured to generate and provide a first control signal to the driver unit when the change in the first voltage is greater than the first threshold value.

18. The wireless charging unit of claim 17, wherein the detector is configured to generate and provide a second control signal to the driver unit when the change in the second voltage is greater than the second threshold value.

19. A wireless charging device comprising:
   a driver unit configured to generate at least a first and second alternating current (AC) voltage signal, wherein the first AC voltage signal has a first frequency and the second AC voltage signal has a second frequency;

a transmitting unit coupled to the driver unit, the transmitting unit including at least a first coil and a first capacitor coupled in series and configured to transmit the first AC voltage signal, and a second coil and a second capacitor coupled in series and configured to transmit the second AC voltage signal; and a control unit coupled to the transmitting unit and the driver unit, the control unit configured to measure at least a first voltage change at a first junction between the first coil and the first capacitor, and measure a second voltage change at a second junction between the second coil and the second capacitor;

wherein the control unit detects a first receiver device when the first voltage change is greater than a first threshold value and detects a second receiver device when the second voltage change is greater than a second threshold value.

20. The wireless charging device of claim 19, wherein the control unit generates a first control signal and sends the first control signal to the driver unit when the control unit detects the first receiver device.

21. The wireless charging device of claim 20, wherein the control unit generates a second control signal and send the second control signal to the driver unit when the control unit detects the second receiver device.

* * * * *